(12) United States Patent
Choi et al.

(10) Patent No.: US 9,100,452 B2
(45) Date of Patent: *Aug. 4, 2015

(54) CONTENT REPRODUCING METHOD AND APPARATUS

(75) Inventors: Yoo-jin Choi, Seoul (KR); Hyun-cheol Park, Suwon-si (KR); Chang-seog Ko, Hwaseong-si (KR); Young-sun Kim, Suwon-si (KR); Jung-kun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/284,666

(22) Filed: Oct. 28, 2011

(65) Prior Publication Data

US 2012/0045985 A1 Feb. 23, 2012

Related U.S. Application Data

(63) Continuation of application No. 11/971,321, filed on Jan. 9, 2008, now Pat. No. 8,060,636.

(30) Foreign Application Priority Data

Jun. 8, 2007 (KR) ........................ 10-2007-0056067

(51) Int. Cl.
*G06F 15/173* (2006.01)
*H04L 29/08* (2006.01)
*H04L 29/06* (2006.01)
*H04N 1/00* (2006.01)

(52) U.S. Cl.
CPC .......... *H04L 67/303* (2013.01); *H04L 65/1083* (2013.01); *H04N 1/00347* (2013.01); *H04L 65/80* (2013.01); *H04N 1/00307* (2013.01); *H04N 2201/001* (2013.01); *H04N 2201/0043* (2013.01); *H04N 2201/0055* (2013.01); *H04N 2201/0089* (2013.01); *H04N 2201/0096* (2013.01)

(58) Field of Classification Search
CPC ............ H04N 21/43615; H04N 7/106; H04N 5/4401; H04N 21/43632
USPC ........ 725/78, 80, 86, 105, 135, 142; 709/217, 709/218, 232, 250
See application file for complete search history.

(56) References Cited

U.S. PATENT DOCUMENTS 7,366,972 B2 * 4/2008 Baumert et al. ............... 715/200
7,519,614 B2 * 4/2009 Glania et al. ..................... 1/1

(Continued)

FOREIGN PATENT DOCUMENTS

JP 2001256162 A 9/2001
JP 2005050126 A 2/2005

OTHER PUBLICATIONS

Communication, dated Jul. 31, 2013, issued by the Korean Intellectual Property Office, in counterpart Application No. 1020070056067.

*Primary Examiner* — Aftab N. Khan
(74) *Attorney, Agent, or Firm* — Sughrue Mion, PLLC

(57) ABSTRACT

A content reproducing method and a content reproducing apparatus capable of continuously reproducing content by searching for an apparatus having optimal capabilities for reproducing the content, when a plurality of content reproducing apparatuses with similar functions are located within a short range of each other.

20 Claims, 6 Drawing Sheets

(56) References Cited

U.S. PATENT DOCUMENTS

| | | | |
|---|---|---|---|
| 7,694,034 B1* | 4/2010 | Breau et al. | 710/16 |
| 7,801,927 B2* | 9/2010 | Kaneko et al. | 707/803 |
| 2001/0024444 A1 | 9/2001 | Asai | |
| 2002/0184646 A1* | 12/2002 | Lord | 725/109 |
| 2003/0110234 A1* | 6/2003 | Egli et al. | 709/217 |
| 2004/0063452 A1 | 4/2004 | Tomoda | |
| 2004/0267965 A1* | 12/2004 | Vasudevan et al. | 709/250 |
| 2005/0281185 A1 | 12/2005 | Kawasaki | |
| 2006/0087926 A1 | 4/2006 | Hwang | |
| 2006/0168001 A1* | 7/2006 | Lasater et al. | 709/205 |
| 2006/0190320 A1 | 8/2006 | Dewa | |
| 2006/0236232 A1* | 10/2006 | Yuasa et al. | 715/517 |
| 2006/0263068 A1 | 11/2006 | Jung | |
| 2007/0065107 A1* | 3/2007 | Ryu et al. | 386/95 |
| 2007/0091357 A1 | 4/2007 | Konno et al. | |
| 2007/0094042 A1 | 4/2007 | Ramer et al. | |
| 2007/0169614 A1 | 7/2007 | Sasaki et al. | |
| 2007/0198682 A1 | 8/2007 | Pazhyannur et al. | |
| 2007/0208735 A1 | 9/2007 | Matsuda et al. | |
| 2007/0250530 A1 | 10/2007 | Choi | |
| 2007/0277205 A1* | 11/2007 | Grannan | 725/80 |
| 2007/0291955 A1 | 12/2007 | Yamashita et al. | |
| 2008/0002945 A1 | 1/2008 | Ushimaru et al. | |
| 2008/0104658 A1 | 5/2008 | Lim | |
| 2008/0275960 A1* | 11/2008 | Myllyla et al. | 709/217 |
| 2008/0299901 A1 | 12/2008 | Kim et al. | |
| 2009/0138921 A1 | 5/2009 | Myata | |
| 2009/0276862 A1 | 11/2009 | Komori et al. | |
| 2010/0115346 A1* | 5/2010 | Lee | 714/49 |

\* cited by examiner

CONTENT REPRODUCING METHOD AND APPARATUS

CROSS-REFERENCE TO RELATED PATENT APPLICATION

This is Continuation of U.S. application Ser. No. 11/971,321 filed on Jan. 9, 2008, which claims priority from Korean Patent Application No. 10-2007-0056067, filed on Jun. 8, 2007 in the Korean Intellectual Property Office; the disclosures of such applications are incorporated herein by reference in their entireties.

BACKGROUND OF THE INVENTION

1. Field of the Invention

Methods and apparatuses consistent with the present invention relate to reproducing content, and more particularly, to reproducing content under optimal reproduction conditions.

2. Description of the Related Art

Recently, various content reproducing apparatuses have been launched. However, capabilities for reproducing multimedia content vary according to different apparatuses. For example, MPEG layer 3 (MP3) players generally have a display size of around 2 inches and a 240×320 pixel resolution. Personal media players (PMPs) generally have a 4 to 5 inch thin film transistor liquid crystal display (TFT-LCD) with a resolution of 480×272 pixels or 800×480 pixels. Mobile phones are more similar to MP3 players in this regard. However, navigation systems have display sizes varying from around 2 inches to 7 inches.

Accordingly, when a user having an MP3 player and a PMP reproduces moving pictures, the user generally uses the PMP, since the PMP has a larger display size and a higher resolution than the MP3 player. However, when the user watches a terrestrial digital multimedia broadcasting (T-DMB) program by using the MP3 player, in order to watch the broadcasting program by using the PMP, the user has to power on the PMP and perform a series of processes, including a process of selecting a channel for watching the same T-DMB program, regardless of the MP3 player. At this time, in order to continuously watch the T-DMB program, the user has to determine whether the broadcasting program is output through the PMP and then turn off the MP3 player.

In addition, when there is another apparatus by which the user can watch the T-DMB program in addition to the PMP, in close range to the MP3 player, in order to correctly determine an apparatus having optimal reproduction capabilities for the broadcasting program, the user has to already know specification information of each apparatus and the type of the content to be reproduced. The type of the reproduced content may be broadly defined so as to represent moving pictures, still pictures, music, text, and something obtained by combining images with audio, or specifically defined so as to represent whether images are in a high definition mode or normal mode, and to represent whether the audio is in a Dolby mode or normal mode. Specifically, in the case of apparatuses with similar reproduction capabilities, such as the mobile phone and the MP3 player, it is difficult for the user to determine which apparatus has optimal reproduction capabilities.

When the user determines, while reproducing the content stored in the MP3 player, that the apparatus having the optimal reproduction capabilities is the PMP, the user has to execute an application in the PMP used to reproduce the content and download the content stored in the MP3 player. When there is another content reproducing apparatus in addition to the PMP in close range to the MP3 player, the user determines which apparatus has the optimal reproduction capabilities for the currently reproduced content from among the content reproducing apparatus, the PMP, and the MP3 player. In order to determine which apparatus has the optimal reproduction capabilities, the user has to know specification information of each apparatus and the type of the reproduced content. When the user does not know the specification information of each apparatus, when the user has wrong specification information of each apparatus, or when the user does not know the type of the content, the apparatus selected by the user may not be the apparatus having the optimal reproduction capabilities.

SUMMARY OF THE INVENTION

The present invention provides a content reproducing method and a content reproducing apparatus capable of continuously reproducing content by searching for an apparatus having optimal reproduction capabilities for reproducing the content, when there are a plurality of content reproducing apparatuses.

According to an aspect of the present invention, there is provided a content reproducing method comprising: determining whether at least one apparatus approaches a first apparatus; determining whether the first apparatus reproduces content, when it is determined that the at least one apparatus approaches the first apparatus; searching for a second apparatus having optimal capabilities for reproducing the content based on specifications of the at least one apparatus, a specification of the first apparatus, and a type of a first content, when the first apparatus is reproducing the first content; the first apparatus requesting the second apparatus to reproduce the first content, when the first apparatus is different from the second apparatus; and continuing to reproduce the first content in the first apparatus, when the first apparatus is the same as the second apparatus.

The content reproducing method further comprises transmitting specification information of the first apparatus to the at least one apparatus which reproduces a second content, when the at least one apparatus which is reproducing the second content and the first apparatus does not reproduce the first content; and reproducing the second content in the first apparatus, when receiving a request to reproduce the second content.

The searching for the second apparatus comprises: determining the type of the first content; determining whether there is an apparatus capable of reproducing the first content with the type from among the at least one apparatus which approaches the first apparatus; and comparing the specification of the first apparatus with the specification of the apparatus capable of reproducing the first content when there is the apparatus capable of reproducing the first content from among the at least one apparatus which approaches the first apparatus. The comparing of the specifications is performed based on a standard that is set according to the type of the first content.

When the first content is stored in the first apparatus, the requesting the second apparatus to reproduce the first content comprises transmitting the first content from the first apparatus to the second apparatus.

When the first content is received through a network, the requesting the second apparatus to reproduce the first content comprises transmitting reception information of the first content from the first apparatus to the second apparatus.

The requesting the second apparatus to reproduce the first content further comprises controlling an operation of the first apparatus so as to allow the second apparatus to continuously reproduce the first content.

The determining whether the at least one apparatus approaches the first apparatus is performed based on a short range wireless communication protocol.

The requesting the second apparatus to reproduce the first content comprises: outputting guidance information of the second apparatus to outside the first apparatus; and requesting the second apparatus to reproduce the first content, when the second apparatus is selected as a reproducing apparatus for the first content based on the guidance information.

According to another aspect of the present invention, there is provided a content reproducing apparatus comprising: a wireless communication module wirelessly determining whether at least one apparatus approaches the content reproducing apparatus; a content reproducing module reproducing a first content; and a control module controlling the reproducing of the first content by searching for a first apparatus having optimal capabilities for reproducing the content based on a specification of the content reproducing apparatus, specifications of the at least one apparatus, and a type of the first content, when it is reported from the wireless communication module that the at least one apparatus approaches the content reproducing apparatus and when the first content is reproduced by the content reproducing module.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described in detail with reference to the attached drawings.

The present invention provides a method and apparatus capable of continuously (or seamlessly) reproducing content by searching for an apparatus having optimal reproduction capabilities by performing short range wireless communication among a plurality of content reproducing apparatuses and by using the found optimal content reproducing apparatus.

Figure 1:
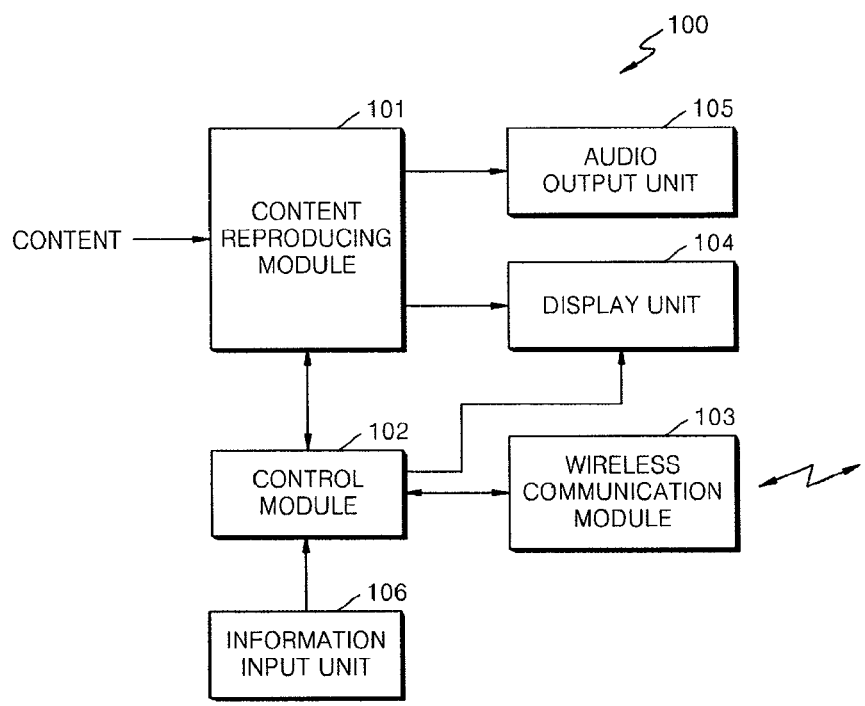
FIG. 1 is a block diagram illustrating a content reproducing apparatus according to an exemplary embodiment of the present invention.

FIG. 1 is a block diagram illustrating a content reproducing apparatus 100 according to an exemplary embodiment of the present invention. Referring to FIG. 1, the content reproducing apparatus 100 includes a content reproducing module 101, a control module 102, a wireless communication module 103, a display unit 104, an audio output unit 105, and an information input unit 106.

When content that is received through a network or that is stored in the content reproducing apparatus 100 is input, the content reproducing module 101 reproduces the input content. The content may be defined based on a file type. When the content is defined based on a file type, the input content may be a content file such as a video file, a still image file, a music file, a text file, a file obtained by combining video with audio, a file obtained by combining a still image with audio, and the like. Although the content reproducing module 101 may be constructed so as to reproduce the content files of all file types, the content reproducing module 101 may be constructed so as to reproduce only content files of some file types from among the aforementioned types of content files.

When the wireless communication module 103 reports that at least one apparatus approaches the apparatus 100 for reproducing content within a predetermined range, the control module 102 determines whether the content reproducing module 101 reproduces content. The predetermined range is set based on the content reproducing apparatus 100. The predetermined range may be set by using a predetermined distance based on the content reproducing apparatus 100 as a diameter or radius.

Figure 2:
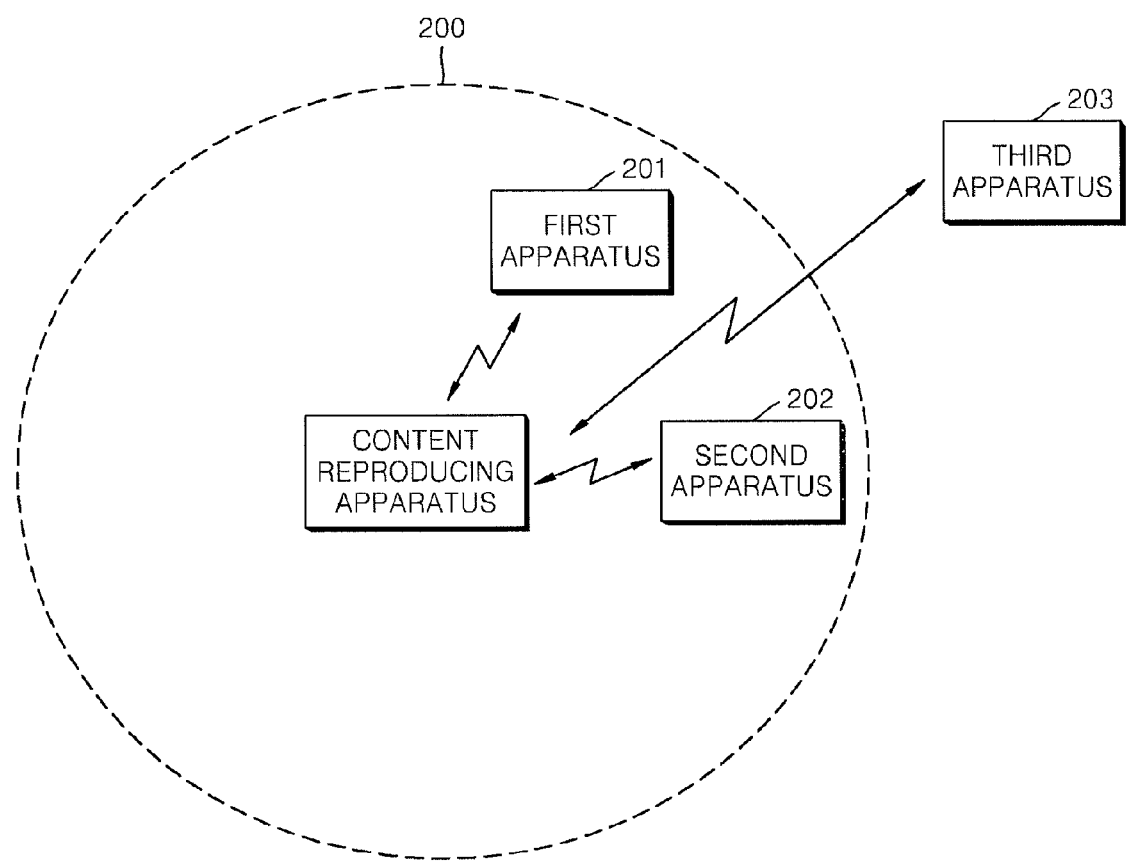
FIG. 2 illustrates an example in which a plurality of apparatuses approach the content reproducing apparatus of FIG. 1 within a predetermined range.

As shown in FIG. 2, a predetermined range 200 is set based on the content reproducing apparatus 100 of FIG. 1. When first and second apparatuses 201 and 202 are within a predetermined range 200, the wireless communication module 103 reports to the control module 102 that the first and second apparatuses 201 and 202 are approaching the content reproducing apparatus 100. FIG. 2 illustrates an example in which a plurality of apparatuses approach the content reproducing apparatus 100 of FIG. 1 within the predetermined range 200. In FIG. 2, since a third apparatus 203 does not approach the content reproducing apparatus 100 regardless of whether the third apparatus 203 has a function similar to that of the content reproducing apparatus 100, the wireless communication module 103 does not report information on the third apparatus 203 to the control module 102.

When the content reproducing module 101 reproduces content, the control module 102 determines the type of the content reproduced by the content reproducing module 101 while receiving specification information on the first and second apparatuses 201 and 202 which are within the predetermined range through the wireless communication module 103. Pieces of specification information of the first and second apparatuses 201 and 202 may be respectively received from the first and second apparatuses 201 and 202 in response to a request of the control module 102. Alternatively, the control module 102 may receive the pieces of specification information of the first and second apparatuses 201 and 202, which are transmitted by the first and second apparatuses 201 and 202, while the first and second apparatuses 201 and 202 approach the predetermined range.

The control module 102 searches for an apparatus having optimal capabilities for reproducing the currently reproduced content based on the specification information of the first and second apparatuses, the specification information of the content reproducing apparatus 100, and the content type information.

That is, the control module 102 determines a type of currently reproduced content. For example, the control module 102 determines whether the type of the currently reproduced content is a video file, a still image file, or a file obtained by combining video with audio. When the type of the currently reproduced content is a file obtained by combining video data with audio, it is possible to determine whether the video is in a high-definition mode or a normal mode and whether the audio is in a Dolby mode or a normal mode.

After determining the type of the reproduced content, the control module 102 determines whether the first and second apparatuses 201 and 202 are capable of reproducing the reproduced content of the aforementioned type. As a result of the determining, when at least one of the first and second apparatuses 201 and 202 is capable of reproducing the currently reproduced content, the control module 102 compares the specification of the content reproducing apparatus 100 with the specification of the apparatus capable of reproducing the currently reproduced content.

For example, when the first and second apparatuses 201 and 202 are capable of reproducing the currently reproduced content, the control module 102 can compare the specification of the first apparatus 201 with that of the content reproducing apparatus 100 and compare the specification of the second apparatus 202 with that of the content reproducing apparatus 100. As a result of the comparison, if the first apparatus 201 has better capabilities for reproducing the content than the content reproducing apparatus 100, the control module 102 searches for an apparatus having optimal reproduction capabilities by comparing the specifications of the first and second apparatuses 201 and 202 with each other. At this time, if it is determined that the second apparatus 202 has capabilities for reproducing the content which are not better than the content reproducing apparatus 100, the control module 102 may not compare the specifications of the first and second apparatuses 201 and 202 with each other.

When comparing specifications with one another, a standard may be set based on content type. For example, when the content type is a video or still image, the comparison standard may be a display size or resolution. When the content type is a music file, the comparison standard may be a music reproduction channel. When the content type is content obtained by combining video with audio, the comparison standard is a display size, a resolution, or an audio reproduction channel. In addition, when there are a plurality of comparison standards, priorities may be set. For example, when the comparison standards include a display size, a resolution, and an audio reproduction channel, the highest priority may be assigned to the display size. When the highest priority is assigned to a display size from among the comparison standards, an apparatus having an optimal display size rather than having the optimal resolution or the optimal audio reproduction channel may be determined as an optimal apparatus. Therefore, the comparison standards may be set in various ways.

As a result of the comparison of the specifications, when the apparatus having the optimal capabilities for reproducing the content is found, the control module 102 controls the reproduction of the content. For example, if the apparatus having the optimal reproduction capabilities for the content is the first apparatus 201, the content reproducing apparatus 100 is not the apparatus having the optimal reproduction capabilities. Therefore, the control module 102 requests the first apparatus 201 to reproduce the content by using the wireless communication module 103.

When the content reproduced by the content reproducing module 102 is stored in the content reproducing apparatus 100, the control module 102 transmits the content stored in the content reproducing apparatus 100 to the first apparatus 201 via the wireless communication module 103. When the content is a video file or music file, in order to continuously reproduce the content in the first apparatus 201, the control module 102 can transmit the content including the previous frame of the frame that is currently reproduced by the content reproducing apparatus 100 to the first apparatus 201. When a predetermined time has elapsed, the control module 102 can turn off the content reproducing apparatus 100. The predetermined time is set based on a time for normally reproducing the content in the first apparatus 201 after transmitting the content to the first apparatus 201.

On the other hand, when the content reproduced by the content reproducing module 101 is received through a network, the control module 102 transmits reception information on the currently received content while requesting the first apparatus 201 to reproduce the content by using the wireless communication module 103. When the content is a digital multimedia broadcasting (DMB) file, the reception information on the content may include information on a received channel, broadcasting program guidance information, and the like. When the first apparatus 201 receives corresponding content based on the reception information of the content and normally reproduces the content, the control module 102 can turn off the content reproducing apparatus 100. As described above, the time for turning off the content reproducing apparatus 100 after transmitting the reception information on the content is based on a predetermined time.

However, the control module 102 can be embodied so as to perform an operation such as turning off the content reproducing apparatus 100 depending on whether information indicating that the content is normally reproduced is received from the first apparatus 201.

The control of the operation of turning off the content reproducing apparatus 100 is defined so that the control module 102 controls the operation of the content reproducing apparatus 100 so as to continuously reproduce the content.

When it is determined that the apparatus having the optimal reproduction capabilities is the content reproducing apparatus 100, the control module 102 continues to reproduce the content in the content reproducing apparatus 100.

In addition, when the wireless communication module 103 reports that the first and second apparatuses 201 and 202 approach the content reproducing apparatus 100 within a predetermined range and when the content reproducing module 101 does not reproduce the content, the content module 102 determines that the content reproducing apparatus 100 does not currently reproduce the content. Accordingly, the control module 102 determines whether there is an apparatus that reproduces the content from among the first and second apparatuses 201 and 202 through the wireless communication module 103. This is determined by determining the current operation modes of the first and second apparatuses 201 and 202 by wireless communication between the first and second apparatuses 201 and 202 and the control module 102. For example, when the current operation mode of the first apparatus 201 is in a broadcasting reception mode or a broadcasting reproduction mode, the control module 102 may determine that the first apparatus 201 currently reproduces the content.

When it is determined that the first apparatus 201 reproduces the content, the control module 102 transmits the specification information on the content reproducing apparatus 100 to the first apparatus 201 through the wireless communication module 103. The control module 102 can transmit the specification information of the content reproducing apparatus 100 to the first apparatus 201 via the wireless communication module 103 in response to the request of the first apparatus 201.

After the control module 102 transmits the specification information of the content reproducing apparatus 100, when the first apparatus 201 requests the content reproducing apparatus 100 to reproduce the content, it is determined that the content reproducing apparatus 100 has the optimal reproduction capabilities for the content reproduced by the first apparatus 201 from among the content reproducing apparatus 100 and the first and second apparatuses 201 and 202. When receiving the content via the wireless communication module 103, the control module 102 stores the received content in a storage unit (not shown) and enables the content reproducing module 101 to reproduce the content that is stored in the storage unit. When receiving the reception information on the content through the wireless communication module 103, the control module 102 receives the content by controlling a content receiving module (not shown) based on the reception information on the received content and reproduces the content that is received by controlling the content reproducing module 101. Accordingly, the content reproducing apparatus 100 of FIG. 1 may further include at least one of the storage unit for storing the content and the content receiving module for receiving the content through a network.

The wireless communication module 103 performs data communication with another apparatus by using a short range wireless communication protocol such as Bluetooth, ZigBee, Wi-Fi, or radio frequency identification (RFID). Specifically, the wireless communication module 103 wirelessly determines (or monitors) whether at least one apparatus approaches the content reproducing apparatus 100 within the predetermined range 200. When it is determined that at least one apparatus approaches the content reproducing apparatus 100 within the predetermined range 200, the wireless communication module 103 reports to the control module 102 that the at least one apparatus approaches the content reproducing apparatus 100.

The display unit 104 displays an image or text reproduced by the content reproducing module 101. In addition, the display unit 104 is controlled by the control module 102. The display unit 104 displays guidance information on the apparatus having the optimal capabilities for reproducing the content. When the apparatus having the optimal capabilities for reproducing the content is not the content reproducing apparatus 100, the control module 102 enables the display unit 104 to display the guidance information. The guidance information may be defined as information for recommending an apparatus having the optimal capabilities for reproducing the content.

The audio output unit 105 outputs an audio signal reproduced by the content reproducing module 101.

The information input unit 106 inputs information, which is input by a user, into the control module 102. Accordingly, when the guidance information is displayed on the display unit 104 and when the user inputs information indicating that the user desires that the content be reproduced by the apparatus associated with the guidance information by using the information input unit 106, as described above, the control module 102 controls the reproduction of the content so that the content is continuously reproduced by the apparatus having the optimal reproduction capabilities.

Figure 3:
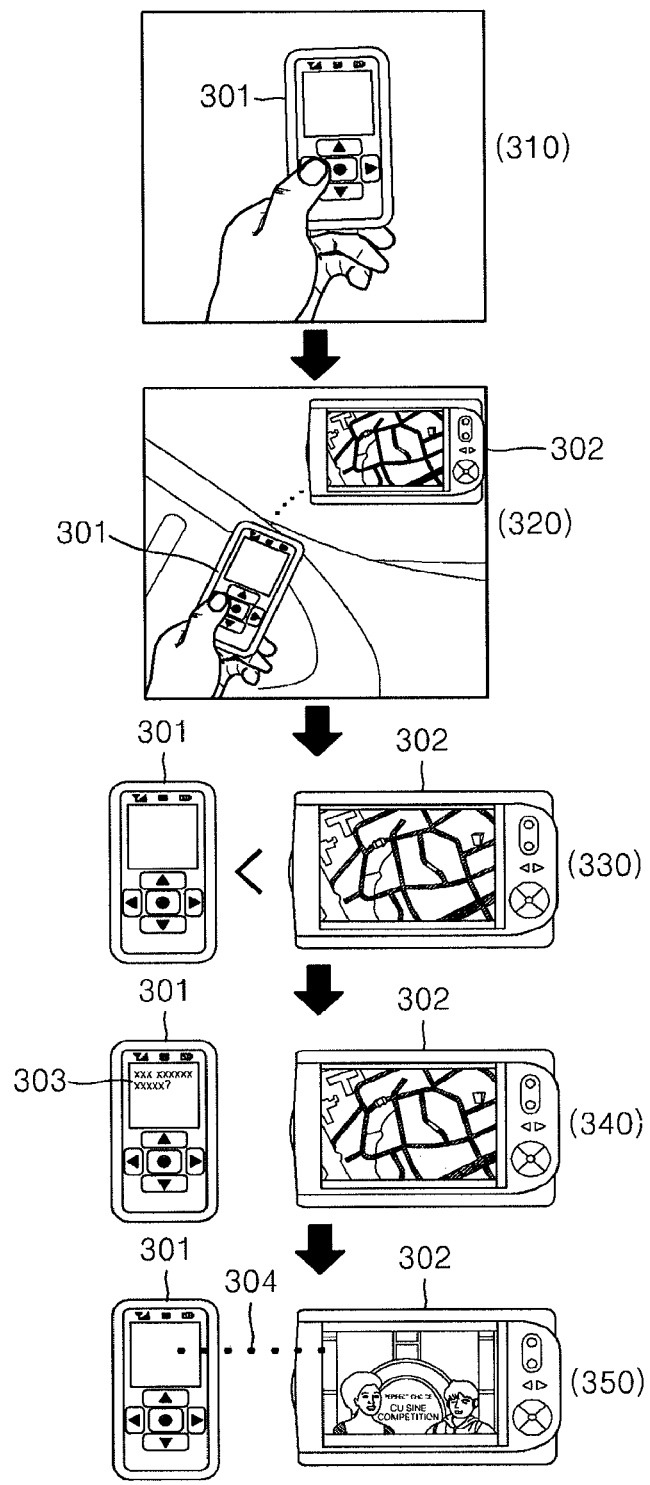
FIG. 3 illustrates an example of a content reproducing apparatus according to an exemplary embodiment of the present invention.

FIG. 3 illustrates a content reproducing apparatus according to an exemplary embodiment of the present invention. In FIG. 1, it is initially determined whether an apparatus approaches the content reproducing apparatus 100 within the predetermined range 200, before it is determined whether the content reproducing apparatus 100 reproduces the content. However, FIG. 3 illustrates a case where the user gets into a car with a navigation system while watching a T-DMB program through an MP3 player 301 corresponding to the content reproducing apparatus 100 of FIG. 1. In this case, it is determined whether an apparatus approaches the content reproducing apparatus 100 within the predetermined range 200, when the content reproducing apparatus 100 reproduces the content.

In FIG. 3, the user watches the T-DMB program through the MP3 player 301 (310). When the user gets into the car with the navigation system 302 (320), a short range wireless communication between the MP3 player 301 and the navigation system 302 starts. It is determined that the MP3 player 301 and the navigation system 302 can receive the T-DMB program by performing short range wireless communication. As a result of comparing the specifications of the MP3 player 301 and the navigation system 302 with each other, when it is determined that the navigation system 302 has better reproduction capabilities than the MP3 player 301 (330), guidance information 303 such as "Do you want to watch this content on a seven inch navigation system?" is displayed on the MP3 player 301 (340). When the user inputs information indicating that the user desires to watch the T-DMB program on the navigation system based on the guidance information 303, the MP3 player 301 transmits information (304) corresponding to the content reception information of FIG. 1 for watching the T-DMB program to the navigation system 302 (350). Accordingly, although the user does not perform any additional control operations for watching the T-DMB program including a channel seeking process in the navigation system 302, the user can continuously watch the T-DMB program, which is previously displayed on the MP3 player 301, on the navigation system 302.

Figure 4:
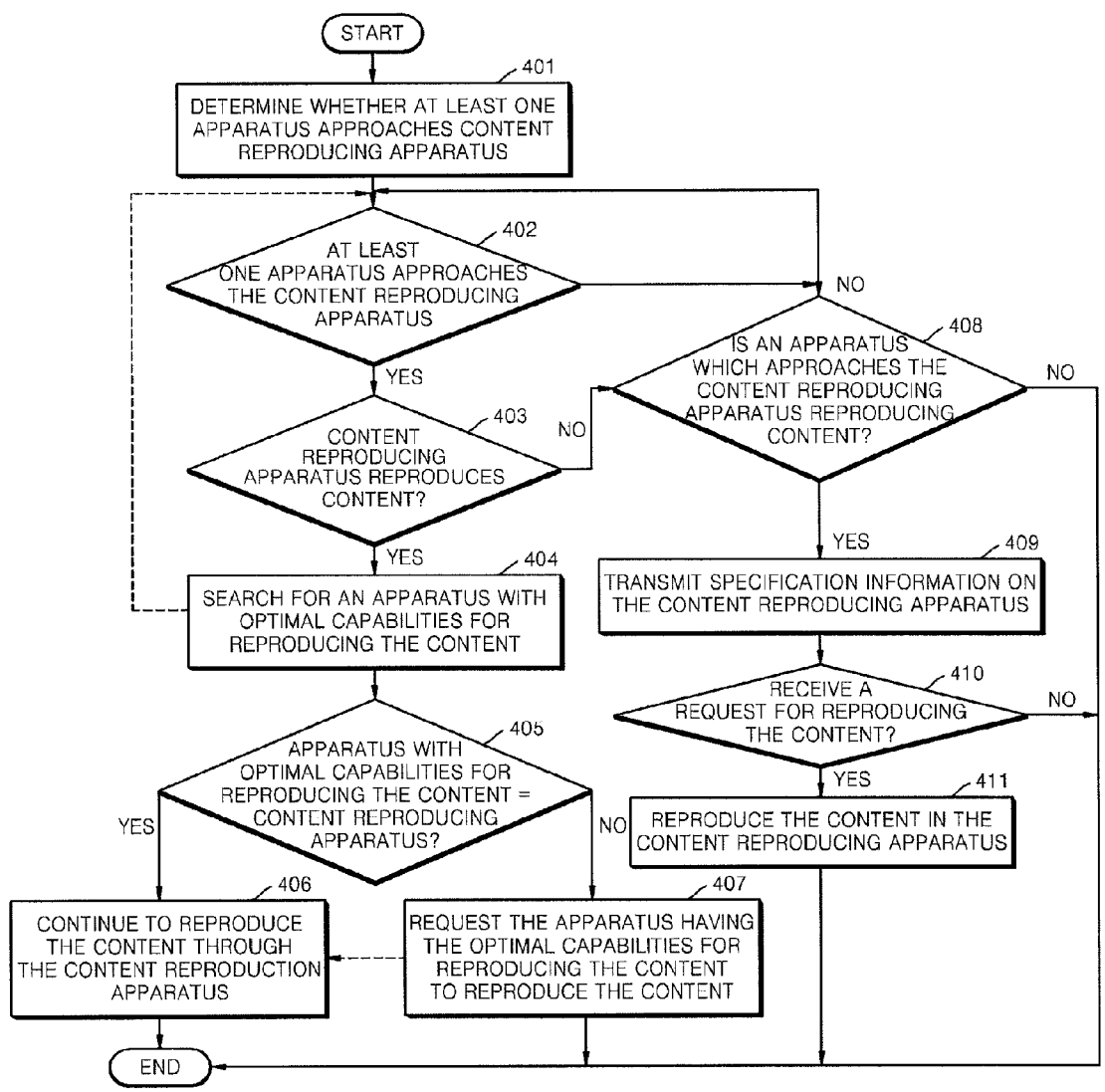
FIG. 4 is a flowchart of a content reproducing method according to an exemplary embodiment of the present invention.

FIG. 4 is a flowchart of a content reproducing method according to an exemplary embodiment of the present invention. For convenience of description, FIG. 4 will be explained with reference to FIGS. 1 and 2.

It is determined whether at least one apparatus approaches the content reproducing apparatus 100 of FIG. 1 within the predetermined range 200 (operation 401). When it is determined that at least one apparatus approaches the content reproducing apparatus 100 within the predetermined range 200 (operation 402), it is determined whether the content reproducing apparatus 100 reproduces the content (operation 403).

When it is determined that the content reproducing apparatus 100 reproduces the content, an apparatus having the optimal reproduction capabilities is searched for based on the specification of the apparatus that approaches the content reproducing apparatus 100 within the predetermined range 200, the specification of the content reproducing apparatus 100, and the type of the content (operation 404). That is, as shown in FIG. 2, when it is determined that the first and second apparatuses 201 and 202 approach the content reproducing apparatus 100 within a short range, an apparatus having the optimal capabilities for reproducing the content is searched for by using a similar method to the method described in relation to the control module 102 of FIG. 1.

Figure 5:
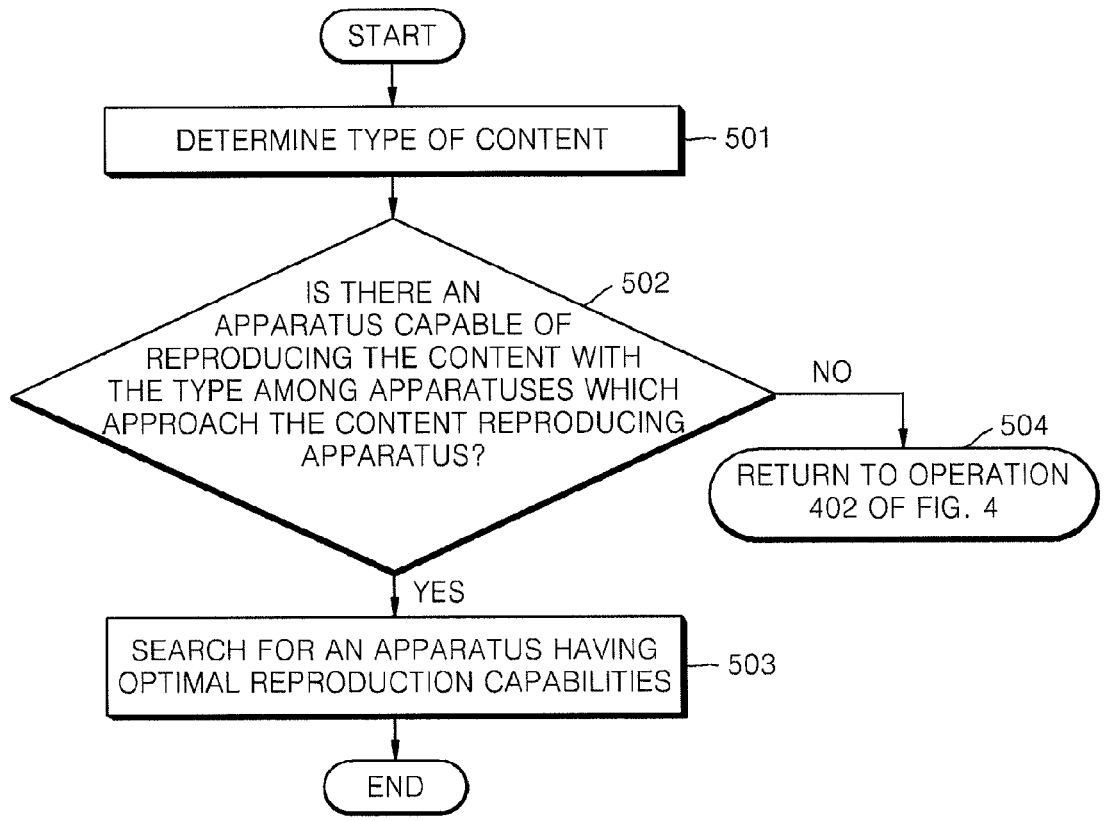
FIG. 5 is a detailed flowchart of a process of searching for an apparatus having optimal reproduction capabilities, illustrated in FIG. 4.

FIG. 5 is a detailed flowchart of operation 404 illustrated in FIG. 4. Referring to FIG. 5, the content reproducing apparatus 100 determines a type of the currently reproduced content (operation 501). The content reproducing apparatus 100 determines whether there is an apparatus capable of reproducing the currently reproduced content of the determined type, from among the apparatuses (the first and second apparatuses 201 and 202) which approach the content reproducing apparatus 100 within the predetermined range 200 (operation 502). When it is determined that there is an apparatus capable of reproducing the currently reproduced content of the determined type, from among the apparatuses which approaches the content reproducing apparatus 100 within the predetermined range 200, an apparatus having the optimal reproduction capabilities is searched for (operation 503). Alternatively, when it is determined that there is no apparatus capable of reproducing the currently reproduced content of the determined type, from among the apparatuses which approaches the content reproducing apparatus 100 within the predetermined range 200, the current process returns to operation 402 of FIG. 4 (operation 504) and repeatedly performs the aforementioned processes.

Referring again to FIG. 4, on the other hand, when the apparatus having the optimal capabilities for reproducing the content that is found in operation 404 is the content reproducing apparatus 100, the content reproducing apparatus 100 continues to reproduce the content (operations 405 and 406).

Alternatively, when the apparatus having the optimal capabilities for reproducing the content is not the content reproducing apparatus 100, the content reproducing apparatus 100 requests the apparatus having the optimal capabilities for reproducing the content to reproduce the content (operations 405 and 407).

Figure 6:
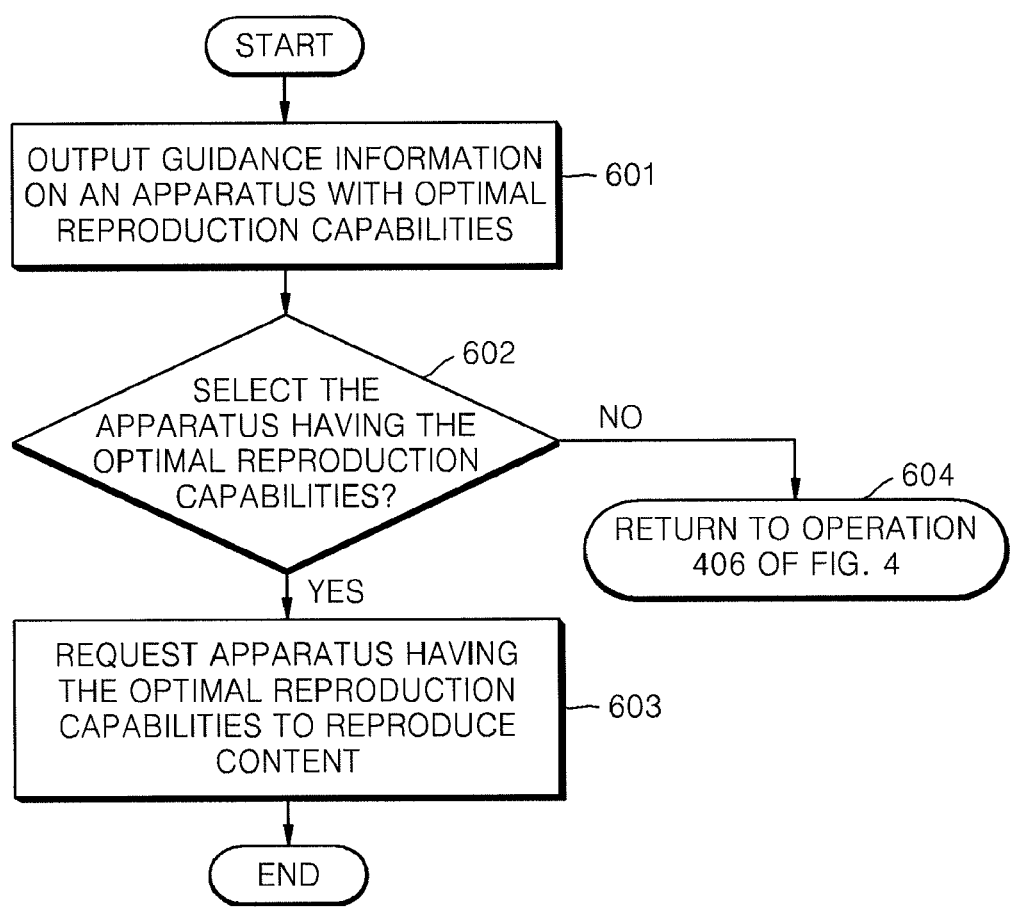
FIG. 6 is a detailed flowchart of a process of requesting an apparatus having optimal reproduction capabilities, illustrated in FIG. 4, to reproduce content.

FIG. 6 is a detailed flowchart of operation 407 illustrated in FIG. 4. Referring to FIG. 6, guidance information on the apparatus having the optimal capabilities for reproducing the content is output on the content reproducing apparatus 100 (operation 601). Accordingly, when the user selects the reproduction of the content by the apparatus having the optimal capabilities for reproducing the content ("YES" in operation 602), the content reproducing apparatus 100 requests the apparatus having the optimal capabilities for reproducing the content to reproduce the content (operation 603). On the other hand, when the user does not select the reproduction of the content by the apparatus having the optimal capabilities for reproducing the content ("NO" in operation 602), the content reproducing apparatus 100 returns to operation 406 of FIG. 4 and repeatedly performs the aforementioned processes (operations 602 and 604).

Referring again to FIG. 4, when it is not determined that at least one apparatus approaches the content reproducing apparatus 100 within the predetermined range 200 in operation 402 of FIG. 4, operation 402 is performed until it is determined that at least one apparatus approaches the content reproducing apparatus 100 within the predetermined range 200. Operation 402 is repeatedly performed until the content reproducing apparatus 100 is turned off.

When it is determined in operation 403 that the content reproducing apparatus 100 does not reproduce the content, it is determined whether at least one apparatus from among the apparatuses which approach the content reproducing apparatus 100 within the predetermined range 200 reproduces the content (operation 408). When it is determined that the at least one apparatus from among the apparatuses which approach the content reproducing apparatus 100 within the predetermined range 200 reproduces the content, the content reproducing apparatus 100 transmits the specification information of the content reproducing apparatus 100 to the at least one apparatus which reproduces the content (operation 409). When a request for reproducing the content is received from the at least one apparatus which reproduces the content ("YES" in operation 410), the content reproducing apparatus 100 reproduces the content (operation 411).

In the exemplary embodiment shown in FIGS. 4 to 6, as in the content reproducing apparatus 100 of FIG. 1, it is determined whether there is an apparatus which approaches the content reproducing apparatus 100 within the predetermined range 200 regardless of whether the content reproducing apparatus 100 reproduces the content. However, as shown in FIG. 3, the content reproducing method according to an exemplary embodiment of the present invention may be embodied so as to reproduce the content by searching for an apparatus having the optimal capabilities for reproducing the content, when there is an apparatus which approaches the content reproducing apparatus 100 within the predetermined range 200 while reproducing a content by the content reproducing apparatus 100.

As described above, when there are a plurality of content reproducing apparatuses with similar functions in a short range, it is possible to continuously reproduce content under the optimal reproduction conditions by continuously reproducing the content by searching for an apparatus having the optimal capabilities for reproducing the content.

The method of reproducing content according to an exemplary embodiment of the invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A content reproducing method comprising:
   determining, by a first apparatus, a type of content being reproduced by the first apparatus, wherein the first apparatus is a mobile apparatus having audio and video reproduction capabilities;
   searching, by the first apparatus, for a second apparatus that is within a predetermined range of the first apparatus;
   determining, by the first apparatus, that the second apparatus is capable of reproducing the type of the content, wherein the second apparatus is a mobile apparatus having audio and video reproduction capabilities;
   comparing, by the first apparatus, a first specification of the first apparatus with a second specification of the second apparatus to determine one of the first apparatus and the second apparatus as an optimal apparatus having optimal capabilities for reproducing the content, in response to determining that the second apparatus is capable of reproducing the type of the content;
   in response to determining that the second apparatus is the optimal apparatus, displaying guidance information for reproducing the content on the second apparatus to a user on the first apparatus; and
   in response to determining that the first apparatus is the optimal apparatus, the first apparatus continues to reproduce the content, wherein the first specification of the first apparatus comprises a reproduction capability of the first apparatus, and wherein the second specification of the second apparatus comprises a reproduction capability of the second apparatus.

2. The content reproducing method of claim 1, further comprising:
transmitting the first specification of the first apparatus to the second apparatus.

3. The content reproducing method of claim 1, further comprising;
requesting the second apparatus to reproduce the content and transmitting the content from the first apparatus to the second apparatus when it is determined that the second apparatus is the optimal apparatus, the content stored on the first apparatus.

4. The content reproducing method of claim 1, further comprising:
outputting guidance information to the second apparatus when it is determined that the second apparatus is the optimal apparatus; and
requesting the second apparatus to reproduce the content, when the second apparatus is selected as the optimal apparatus based on the guidance information.

5. The content reproducing method of claim 1, further comprising:
requesting the second apparatus to reproduce the content and transmitting reception information of the content from the first apparatus to the second apparatus, the content received through a network.

6. The content reproducing method of claim 5, wherein the requesting the second apparatus to reproduce the content further comprises controlling an operation of the first apparatus so as to allow the second apparatus to continue to reproduce the content.

7. The content reproducing method of claim 1, further comprising:
determining whether the second apparatus approaches the first apparatus based on a short range wireless communication protocol.

8. The content reproducing method of claim 7, wherein the determining whether the second apparatus approaches the first apparatus is performed in a communication range using a wireless communication module of the first apparatus.

9. A content reproducing apparatus comprising:
a content reproducing module which reproduces content; and
a processor which, when the content is being reproduced by the content reproducing module, determines a type of the content, searches for another content reproducing apparatus that is within a predetermined range of the content reproducing apparatus, determines that the another content reproducing apparatus is capable of reproducing the type of the content, compares a first specification of the content reproducing apparatus with a second specification of the another content reproducing apparatus in response to determining that the another content reproducing apparatus is capable of reproducing the type of the content, determines one of the content reproducing apparatus and the another content reproducing apparatus as an optimal apparatus having optimal capabilities for reproducing the content, in response to determining that the another content reproducing apparatus is the optimal apparatus, displays guidance information for reproducing the content on the another content reproducing apparatus to a user on the content reproducing apparatus, and in response to determining that the content reproducing apparatus is the optimal apparatus, controls the content reproducing apparatus to continue to reproduce the content, wherein the content reproducing apparatus is a mobile apparatus having audio and video reproduction capabilities,
wherein the another content reproducing apparatus is a mobile apparatus having audio and video reproduction capabilities,
wherein the first specification of the content reproducing apparatus comprises a reproduction capability of the content reproducing apparatus, and
wherein the second specification of the another content reproducing apparatus comprises a reproduction capability of the another content reproducing apparatus.

10. The content reproducing apparatus of claim 9,
wherein the processor determines the optimal apparatus by comparing the second specification with the first specification based on a standard that is set with respect to the type of the content.

11. The content reproducing apparatus of claim 9, wherein if the content is stored in the content reproducing apparatus and if the another content reproducing apparatus is the optimal apparatus, the processor transmits the content to the another content reproducing apparatus while requesting the another content reproducing apparatus to reproduce the content through the wireless communication module.

12. The content reproducing apparatus of claim 9, wherein the content reproducing apparatus further includes a display unit which displays the content and guidance information,
wherein if the another content reproducing apparatus is different from the content reproducing apparatus, the processor displays the guidance information of the another content reproducing apparatus on the display unit, and
wherein if the another content reproducing apparatus is selected as the optimal apparatus based on the guidance information, the processor requests the another content reproducing apparatus to reproduce the content through the wireless communication module.

13. The content reproducing apparatus of claim 9, further comprising:
a wireless communication module that detects the another content reproducing apparatus in a communication range of the content reproducing apparatus.

14. A content reproducing apparatus comprising:
a wireless communication module that detects a presence of another apparatus within a wireless communication range of the wireless communication module; and
a processor that determines a type of content being reproduced by the content reproducing apparatus is reproducible by the detected another apparatus, in response to the wireless communication module detecting the presence of the another apparatus, determines one of the content reproducing apparatus and the another apparatus as an optimal apparatus having optimal capabilities for reproducing the type of the content, in response to determining that the another apparatus is the optimal apparatus, displays guidance information for reproducing the content on the another apparatus to a user on the content reproducing apparatus, in response to determining that the content reproducing apparatus is the optimal apparatus, controls the content reproducing apparatus to continue reproduce the content on the content reproducing apparatus, wherein the content reproducing apparatus is a mobile apparatus having audio and video reproduction capabilities, and wherein the another apparatus is a mobile apparatus having audio and video reproduction capabilities.

15. The content reproducing apparatus of claim 14, wherein the processor controlling the content reproducing apparatus to reproduce the content on the optimal apparatus comprises the processor controlling the content reproducing apparatus to reproduce the content in response to determining the content reproducing apparatus as the optimal apparatus.

16. The content reproducing apparatus of claim 14, wherein the processor controlling the content reproducing apparatus to reproduce the content on the optimal apparatus comprises the processor controlling the wireless communication module to transmit the content to the another apparatus for reproduction of the content on the another apparatus in response to determining the another apparatus as the optimal apparatus.

17. The content reproducing apparatus of claim 14, wherein the processor controlling the content reproducing apparatus to reproduce the content on the optimal apparatus comprises the processor controlling the wireless communication module to transmit to the another apparatus reception information that enables the another apparatus to receive the content using the reception information for reproduction of the content on the another apparatus in response to determining the another apparatus as the optimal apparatus.

18. The content reproducing apparatus of claim 14, wherein the type of the content comprises at least one of video, a still image, and audio.

19. The content reproducing apparatus of claim 14, wherein the processor determining the one of the content reproducing apparatus and the another apparatus as the optimal apparatus comprises:

the processor comparing a first content reproduction specification of the content reproducing apparatus to a second content reproduction specification of the another apparatus;

the processor determining one of the first content reproduction specification and the second content reproduction specification as an optimal specification for reproducing the type of the content; and the processor selecting the one of the content reproducing apparatus and the another apparatus having the determined optimal specification as the optimal apparatus.

20. The content reproducing apparatus of claim 19, wherein the first content reproduction specification of the content reproducing apparatus comprises at least one of a first size of a first display of the content reproducing apparatus, a first resolution of the first display, and a first audio reproduction channel of the content reproducing apparatus, and wherein the second content reproduction specification of the another apparatus comprises at least one of a second size of a second display of the another apparatus, a second resolution of the second display, and a second audio reproduction channel of the another apparatus.

* * * * *